May 22, 1928.
L. E. LA BRIE
BRAKE
Filed Nov. 29, 1926
1,670,729
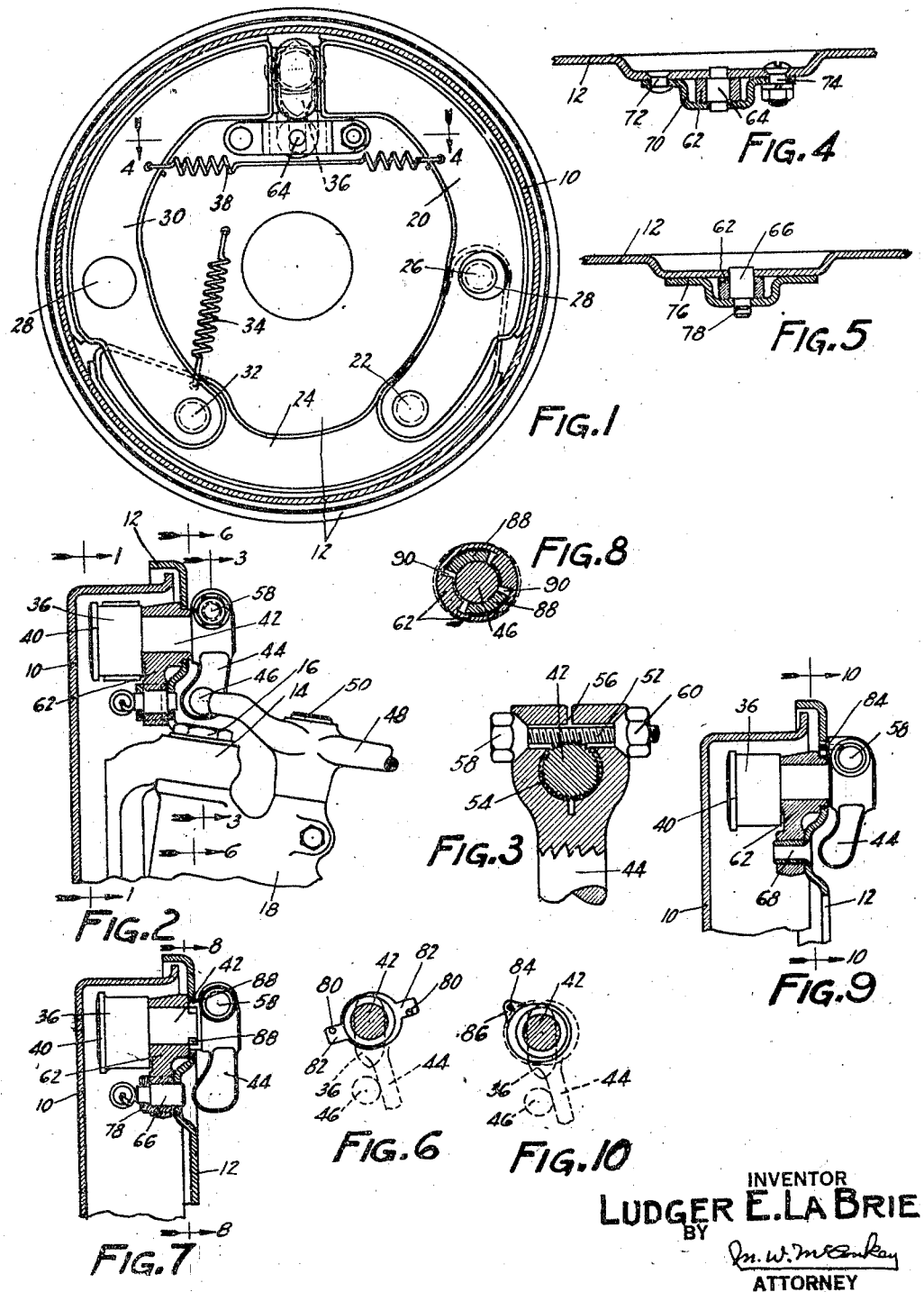
INVENTOR
LUDGER E. LA BRIE
BY
ATTORNEY Patented May 22, 1928.

1,670,729

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed November 29, 1926. Serial No. 151,374.

This invention relates to brakes and is illustrated as embodied in an internal expanding brake for the front wheel of an automobile provided with novel operating and adjusting means. An object of the invention is to provide means such as stops determining the angular position of the cam or equivalent brake-applying device with respect to the friction means of the brake, and preferably in combination with an adjustment such that the stop and the cam can be set to hold the shoes or other friction means of the brake when in released position with any desired clearance with respect to the brake drum. In one desirable arrangement, the operating means includes an arm which is mounted on a brake-applying shaft in such a manner as to permit it to be adjusted angularly on the shaft, and this arm is provided with a stop cooperating with a support which carries the brake-applying means. Thus the shaft can be adjusted from time to time to new angular positions to compensate for the wear of the brakes while the stops will still determine the released or idle position of the shaft.

Other objects and features of the invention, including a novel support or mounting for the brake-applying shaft, and other desirable and novel details of construction, will be apparent from the following description of the illustrative embodiments shown in the accompanying drawing, in which:

Figure 1 is a vertical section through the brake just inside the head of the brake drum and showing the brake shoes in side elevation;

Figure 2 is a vertical section through the upper part of the brake at right angles to the section of Figure 1 and showing the brake-applying means;

Figure 3 is a partial section on the line 3—3 of Figure 2 showing the adjustment of the brake-applying arm on the brake-applying shaft;

Figure 4 is a partial section on the line 4—4 of Figure 1 showing one manner of supporting the bracket or bearing forming the support for the brake-applying shaft;

Figure 5 is a view corresponding to Figure 4 but showing a modified form of mounting for the shaft support;

Figure 6 is a partial diagrammatic section on the line 6—6 of Figure 2 showing the novel stops in their relation to the cam;

Figure 7 is a view corresponding to Figure 2 but showing a device having stops of different form;

Figure 8 is a partial section on the line 8—8 of Figure 7 showing the arrangement of the stops;

Figure 9 is a view corresponding to Figures 2 and 7 but showing a third form of stop; and Figure 10 is a partial diagrammatic section on the line 10—10 of Figure 9 showing the arrangement of the stop with respect to the cam.

The brake selected for illustration includes a rotatable drum 10, at the open side of which is arranged a suitable backing plate or other support 12 carried by a knuckle 14 swivelled by a king-pin 16 or the like at one end of a front axle 18. The particular friction means illustrated includes a brake shoe 20 anchored on a pivot 22 carried by the backing plate 12, a second shoe 24 projecting between spaced arms forming the end of the shoe 20 and anchored on a pivot 26 passing through relatively large openings 28 in said arms and carried by the backing plate 12, and a third shoe 30 connected to the unanchored end of the shoe 24 by a floating pivot 32 and arranged to be operated in applying the brake to force the shoe 24 toward the drum against the resistance of an auxiliary return spring 34. The brake is arranged to be applied by a suitable means such as a double cam 36, which acts against a return spring 38, and which may have at its end a flange 40 confining the ends of the shoes 20 and 30 against lateral movement. This brake is substantially as fully described in Patent No. 1,567,716, granted Bendix Brake Company on December 29, 1925, on an application of A. Y. Dodge.

The cam 36 or its equivalent may be operated by a shaft 42 on the end of which there is mounted a lever or arm 44 having its lower end flattened to be engaged by a ball 46 integrally formed on the end of the lever 48 mounted on a pivot 50 carried by the axle 18. The center of the ball 46 is preferably arranged when the brake is applied either in the axis of the king-pin 16 or a few hundredths of an inch from that axis on the side next the drum 10. Preferably the arm 44 is mounted on the shaft 42 in such a manner as to permit it to be adjusted angularly on the shaft as the brake wears in use. One means of making this adjustment is shown in Figure 3 and includes a bolt 52 having its thread serving as a worm to engage worm gear teeth 54 cut in the shaft 42. The bolt 52 is arranged to bridge a slot 56 in the upper end of the lever 44 with its head 58 seated in a conical depression formed on one side of the arm and with a nut 60 threaded on its other end and provided with a conical base seated in a similar depression on the opposite side of the arm. It will be seen that by loosening the nut 60 and turning the bolt 52 the arm 44 can be adjusted angularly on the shaft and that by tightening the nut 60 to contract the slot 56 the arm can be clamped in any adjusted position.

The shaft 42 is shown journalled in a bracket 62 which serves as a support for the shaft and which in turn is mounted by a pivot pin 64 (Figure 4) or 66 (Figure 5) or 68 (Figure 9) on the backing plate 12, which thus serves to support the shaft through the bracket 62. In the arrangement of Figure 4 one end of the pivot 64 is inserted in an opening in the backing plate 12 while the other end is inserted in a similar opening in a stamping 70 forming an outboard bearing for the pivot and which is fixed to the backing plate by a rivet or the like 72 at one end. The stamping 70 is preferably resilient and is drawn against the backing plate 12 at the end opposite the rivet 72 by means such as a bolt 74 to place the stamping under tension, thus frictionally gripping the lower end of the bracket 62 in such a manner as to resist its angular movement, while at the same time permitting it to be shifted when the brake is applied so that the cam 36 may automatically center itself. In the arrangement of Figure 5, the stamping 76 forming the outboard bearing for the pivot 66 is spot-welded at its opposite ends to the backing plate 12. In this modification the part of the pivot 66 which passes through the backing plate 12 is of the same diameter as the part in support 62, and the pin 66 is therefore held against axial movement by means such as a cotter pin 78 engaging the side of stamping 76 opposite the backing plate 12. In the arrangement of Figure 9, the pivot 68 is in the form of a hollow rivet carried by the backing plate 12.

According to an important feature of the invention, arm 44 or its equivalent and one or the other of the supports 12 and 62 are provided with inter-engaging stops which determine the idle position of the arm 44 and shaft 42 and which may also if desired be arranged to limit the brake-applying movement of the shaft so as to warn the driver that adjustment of the brakes is required when the lining is so worn that the stop comes into play in this direction. Inasmuch as the arm 44 is adjusted on the shaft 42, I prefer to provide the stops on the arm rather than on the shaft itself, so that, as the adjustment is manipulated from time to time as the brake wears, the cam 36 will gradually assume a position more and more inclined toward its active position, at the time the brake is released, to preserve approximately uniform clearance between the shoes 20 and 30 and the drum 10 when the brake is released.

In the arrangement of Figures 2 and 6, the arm 44 carries a pair of pins 80 passing through slots 82 cut in the backing plate 12. The position of the parts when the brake is released, before any adjustment of the arm 44 has been made, is shown in Figure 6. As the adjustments are made, the cam 36 will gradually be turned more and more in a counter-clockwise direction in this figure, so that it will be held by engagement of the pins 80 with the sides of the slots 82 and prevented from assuming a vertical position, thus spreading the shoes 20 and 30 apart to adjust their clearance in idle position with respect to the brake drum 10. In the arrangement of Figures 9 and 10, there is only a single pin 84 arranged in a slot or recess 86 in the backing plate 12 and operating the same as the pins 80. In the arrangement of Figures 7 and 8, arcuate lugs 88 are formed on the arm 44 and are arranged to project into arcuate openings or recesses 90 formed in support 62.

While several illustrative embodiments have been described in detail, it is not my intention to limit the scope of the invention to those particular embodiments or otherwise than by the terms of the appended claims.

I claim:

1. A brake control comprising, in combination, a brake-applying device having a shaft, a support in which the shaft is journalled, an operating lever having a hub secured on the shaft, and stop devices respectively carried by the support and the hub and limiting the angular movement of the shaft.

2. A brake control comprising, in combination, a brake-applying device having a shaft, a support in which the shaft is journalled, an operating lever having a hub secured on the shaft, stop devices respectively carried by the support and the hub and limiting the angular movement of the shaft, and means for adjusting the lever angularly on the shaft.

3. A brake control comprising, in combination, a brake-applying device having a shaft, a support in which the shaft is journalled and which is formed with a notch, and an operating lever having a hub secured on the shaft and provided with a projection arranged in said notch.

4. A brake control comprising, in combination, a brake-applying device having a shaft, a support in which the shaft is journalled and which is formed with a notch, an operating lever having a hub secured on the shaft and provided with a projection arranged in said notch, and means for adjusting the lever angularly on the shaft.

5. A brake control comprising, in combination, a brake-applying device having a shaft, a support in which the shaft is journalled and which is formed with diametrically-opposite notches, and an operating lever having a hub secured on the shaft and provided with diametrically-opposite projections arranged in said notches.

6. A brake control comprising, in combination, a brake-applying device having a shaft, a support in which the shaft is journalled, and a lever having a hub secured on said shaft, the hub and the support having portions adjacent each other and one of which portions is formed with an opening and the other of which portions is provided with a projection arranged in the opening.

7. A brake control comprising, in combination, a brake-applying device having a shaft, a support in which the shaft is journalled, a lever having a hub secured on said shaft, the hub and the support having portions adjacent each other and one of which portions is formed with an opening and the other of which portions is provided with a projection arranged in the opening, and means for adjusting the lever angularly on the shaft.

8. A brake control comprising, in combination, a brake-applying device having a shaft, a support in which the shaft is journalled and which is extended at one side as an arm, a second support adjacent said arm, a pivot for the arm having one end mounted in the second support, a resilient member secured at its first end to the second support and carrying the opposite end of said pivot and engaging the face of the arm opposite the second support, and means for drawing the second end of the resilient member toward the second support to grip said arm frictionally between the resilient member and the second support.

9. A brake control comprising, in combination, a brake-applying device having a shaft, a support in which the shaft is journalled and which is extended at one side as an arm, a second support adjacent said arm, a pivot for the arm having one end mounted in the second support, a resilient member secured at its first end to the second support and carrying the opposite end of said pivot and engaging the face of the arm opposite the second support, and means for securing the second end of the resilient member to the second support.

In testimony whereof, I have hereunto signed my name.

LUDGER E. LA BRIE.